US012789738B2

(12) United States Patent
Franco et al.

(10) Patent No.: US 12,789,738 B2
(45) Date of Patent: Nov. 10, 2026

(54) INTEGRATED RESTRAINTS CONTROL MODULE

(71) Applicant: Tesla, Inc., Austin, TX (US)

(72) Inventors: Frank Anthony Franco, Stamford, CT (US); Daniel Myles Wood, Livermore, CA (US); Zachary Spike Levenberg, San Francisco, CA (US); Vipul Chawla, Saratoga, CA (US); Diptesh Deepak Malatpure, San Carlos, CA (US); Barry Feng, Sunnyvale, CA (US)

(73) Assignee: Tesla, Inc., Austin, TX (US)

( * ) Notice: Subject to any disclaimer, the term of this patent is extended or adjusted under 35 U.S.C. 154(b) by 12 days.

(21) Appl. No.: 18/936,723

(22) Filed: Nov. 4, 2024

(65) Prior Publication Data

US 2026/0125022 A1 May 7, 2026

(51) Int. Cl.

*B60R 21/017* (2006.01)
*B60R 21/01* (2006.01)
*B60R 21/0132* (2006.01)
*B60R 21/264* (2006.01)

(52) U.S. Cl.

CPC ........ *B60R 21/017* (2013.01); *B60R 21/0132* (2013.01); *B60R 21/264* (2013.01); *B60R 2021/01286* (2013.01)

(58) Field of Classification Search

CPC . B60R 21/017; B60R 21/0132; B60R 21/264; B60R 2021/01286

See application file for complete search history.

(56) References Cited

U.S. PATENT DOCUMENTS 7,069,860 B2 * 7/2006 Okamoto ............ B60R 21/2644 102/206
2005/0283333 A1 * 12/2005 Johannes ............ H01R 13/665 702/156
2013/0154352 A1 * 6/2013 Tokarz .................. B60L 3/0046 307/9.1
2024/0429688 A1 * 12/2024 Wang ........................ B60L 3/04

* cited by examiner

*Primary Examiner* — Grant Moubry
*Assistant Examiner* — Ruben Picon-Feliciano
(74) *Attorney, Agent, or Firm* — Schwegman Lundberg & Woessner, P.A.

(57) ABSTRACT

The present disclosure provides for technological solutions that address technological challenges arising in the field of vehicle components. Some examples include system architectures that integrate one or more restraint control modules (RCMs) with one or more vehicle control units and system architectures that use an RCM as a stand-alone device. For example, a vehicle can include a vehicle control unit connected to various sensors throughout the vehicle. An RCM can be integrated into the vehicle control unit and connected to various airbag systems throughout the vehicle. The RCM can deploy the airbag systems based on sensor data available through the vehicle control unit.

20 Claims, 6 Drawing Sheets

INTEGRATED RESTRAINTS CONTROL MODULE

TECHNICAL FIELD

The present disclosure generally relates to vehicle components. In particular, the present disclosure relates to restraints control modules integrated with vehicle controllers or as stand-alone devices.

BACKGROUND

In vehicles, a restraint control module (RCM) serves an important role in sensing a collision, controlling airbag deployment, and storing data related to the collision. Given the importance of controlling airbag deployment, the RCM plays an important role in maintaining passenger safety in a vehicle because of its part in controlling airbag deployment. Indeed, milliseconds of delay in the deployment of an airbag may have a dramatic effect on passenger safety in the event of a collision. Thus, vehicle controller architectures must be carefully designed to optimally incorporate RCMs while maintaining an efficient design.

BRIEF DESCRIPTION OF THE DRAWINGS

The figures, which may use like numerals to reference the same or similar elements, depict various examples of the present disclosure for purposes of illustration and are not to be considered as limiting in scope. One skilled in the art will readily recognize that additional example embodiments are possible without departing from the principles of the present disclosure.

DETAILED DESCRIPTION

Figure 1:
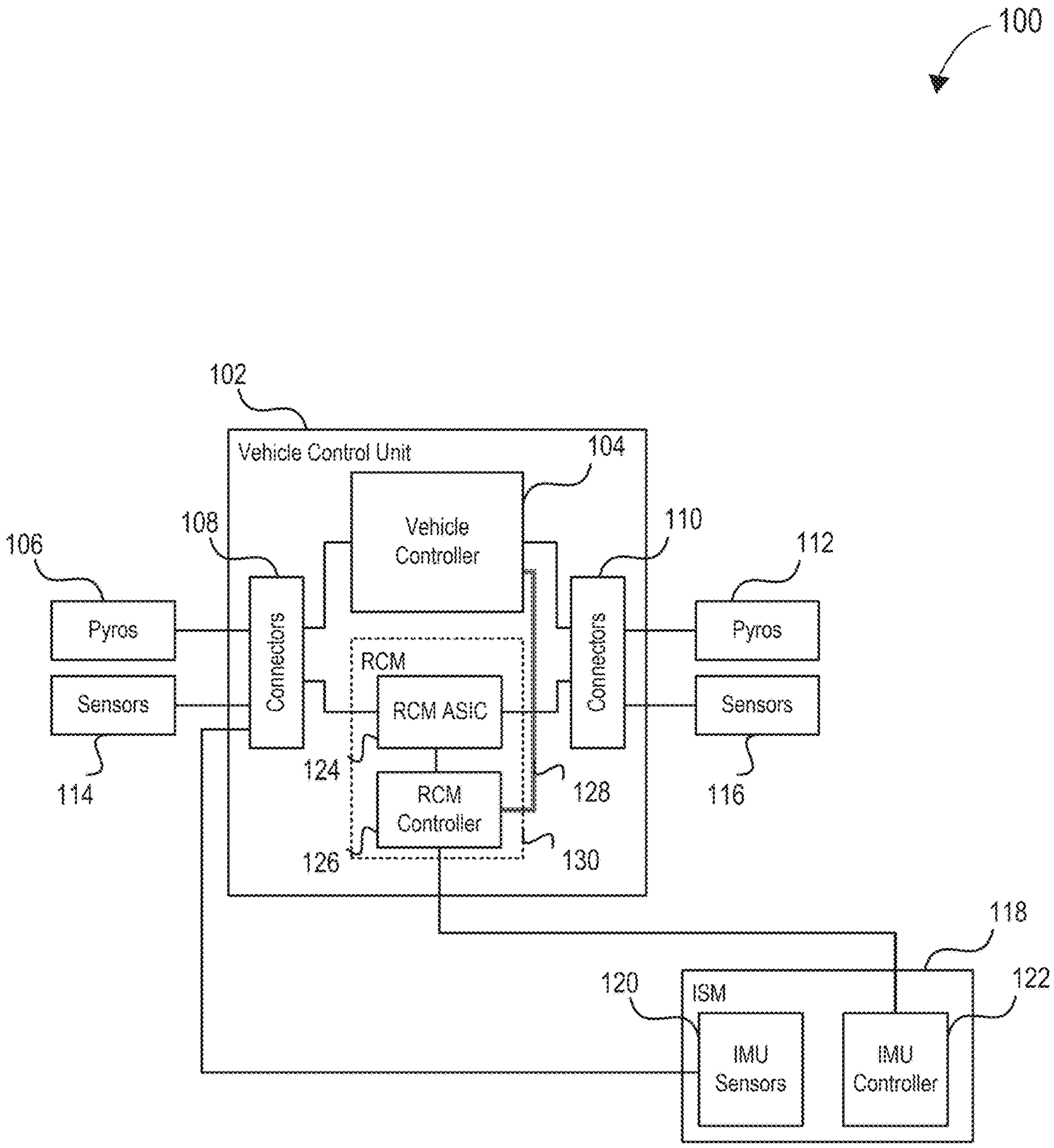
FIG. 1 is a system diagram illustrating an architecture of a vehicle controller with an integrated restraints control module, according to some examples.

A typical restraint control module (RCM) uses an acceleration sensor to measure deceleration and deploy airbags when the measured deceleration indicates a collision has occurred. Typically, the RCM is packaged with the acceleration sensor to reduce costs, and the combination of the RCM and the acceleration sensor is placed in a central location in the vehicle. However, as vehicle technologies continue to advance and techniques for detecting collisions and predicting collisions are developed, an RCM that merely relies on an acceleration sensor to detect collisions is suboptimal. Therefore, a typical RCM that is packaged with an acceleration sensor as one unit is problematic because the RCM is separated from the various systems that can be used to detect and predict collisions. Furthermore, the location of the RCM when it is packaged with the acceleration sensor is suboptimal because it is inefficient to wire all the various systems to the RCM. Thus, the typical RCM that is packaged with an acceleration sensor as one unit has been rendered suboptimal and problematic by advances in vehicle technologies.

The present disclosure addresses the aforementioned technical problems by providing for system architectures that integrate one or more RCMs with one or more vehicle control units, system architectures that use RCMs in a distributed fashion, and system architectures that use an RCM as a stand-alone device not packaged with other sensors. For example, a vehicle can include a vehicle control unit that is connected to various sensors throughout the vehicle including, for example, inertial measurement units (IMUs), accelerometers, impact sensors, pressure sensors, proximity sensors, cameras, wheel speed sensors, seat occupancy sensors, steering wheel torque sensors, brake pedal position sensors, and accelerator pedal position sensors. The vehicle control unit can be positioned in locations throughout the vehicle, such as behind the dashboard, behind the center console, behind a footwell area, behind the steering wheel, or underneath a seat. In examples, an RCM can be integrated in the vehicle control unit. Sensor data available to the vehicle control unit can likewise available to the RCM via direct connections (e.g., printed circuit board (PCB) connections, traces on a PCB) with connectors within the vehicle control unit. The RCM integrated in the vehicle control unit is connected to various airbag systems throughout the vehicle including, for example, driver side airbags, passenger side airbags, curtain airbags, seat airbags, and knee airbags. The RCM can deploy the airbag systems based on sensor data available to the vehicle control unit. In some examples, the vehicle control unit includes pre-crash detection functions that, in communication with the RCM, allows for priming of the airbag systems to facilitate fast and efficient deployment.

As illustrated in this example, system architectures that flexibly use one or more RCMs in stand-alone or distributed fashions provide for various improvements. For example, an RCM can be integrated with a vehicle control unit that is already wired to sensors that the RCM uses to provide for improved efficiency in vehicle design by reducing packaging space, reducing harnessing, and reducing wiring. Furthermore, integrating the RCM with the vehicle control unit provides for improved flexibility in vehicle design by allowing the RCM to be placed in various locations throughout the vehicle. Scalability for additional airbag systems and additional sensors is also improved because these systems and sensors can be efficiently connected to the RCM. Communication with the RCM is enhanced because the RCM is in direct connection with the vehicle control unit. This allows for the RCM to deploy airbags more intelligently by relying on a variety of available sensor information and, in some cases, pre-crash detection functions.

Furthermore, RCMs can be distributed in different areas throughout the vehicle and be responsible for deploying airbag systems in their respective areas of the vehicle. For example, four RCMs can be distributed in the front, rear, left, and right areas of a vehicle. Each RCM is responsible for deployment of airbag systems in its respective area, which provides for improved efficiency in locating RCMs closer to the devices for which they are responsible. Furthermore, each RCM is closer to the sensors that are used for controlling whether to deploy airbag systems in each area. For example, an RCM located in the front area of the vehicle is responsible for deploying airbag systems in the front area of the vehicle. The RCM located in the front area of the vehicle is closer to the airbag systems in the front area of the vehicle and closer to the sensors in the front area of the vehicle. Furthermore, the distributed RCMs communicate with each other to facilitate airbag deployment decisions by the RCMs. Further details related to the system architectures of the present disclosure are provided below.

FIG. 1 is a block diagram illustrating an architecture 100 of a vehicle control system with an integrated restraints control module, according to some examples. The architecture 100 depicted here can, for example, be included in the vehicle 602 of FIG. 6. As illustrated in FIG. 1, the architecture 100 includes a vehicle control unit 102 or VCU. The vehicle control unit 102 includes a vehicle controller 104. In some examples, the vehicle controller 104 performs various vehicle functions, such as overseeing and coordinating various vehicle systems, such as motor control systems, battery management systems, braking systems, and advanced driver assistance systems. To perform its various vehicle functions, the vehicle controller 104 processes data from various sensors of the vehicle 602, such as sensors 114 and sensors 116. For example, the sensors 114 includes impact sensors for a left side of the vehicle 602 and the sensors 116 includes impact sensors for a right side of the vehicle. The vehicle controller 104 receives data from the sensors 114 and the sensors 116 through connectors 108 and connectors 110. The vehicle controller 104 also receives and processes data from inertia measuring unit (IMU) sensors 120 of an inertia sensing module (ISM) 118.

As illustrated here, the vehicle controller 104 of the vehicle control unit 102 is connected to the various sensors of the vehicle 602 and by integrating an RCM 130 in the vehicle control unit 102, the RCM 130 is also connected to the various sensors of the vehicle 602 in an efficient design. This integration may enable direct onboard communication between the RCM 130 and other vehicle controller functions, enhancing the system's responsiveness and reliability. For example, a shared PCB and connectors may reduce the overall number of components, simplifying the manufacturing process and lowering costs. Additionally, the integrated design minimizes the physical footprint of the RCM 130, freeing up valuable space within the vehicle for other components or design considerations.

The RCM 130 includes an RCM ASIC 124 and an RCM controller 126. The RCM ASIC 124 processes sensor data, such as sensor data from the sensors 114, the sensors 116, and the IMU sensors 120, and facilitates airbag deployment decisions. For example, the RCM ASIC 124 processes impact data from the sensors 114 and the sensors 116 and processes acceleration/deceleration data from the IMU sensors 120. The RCM ASIC 124, in conjunction with the RCM controller 126, make airbag deployment decisions and communicate the airbag deployment decisions to airbag systems of the vehicle 602, including pyrotechnic initiators 106 and pyrotechnic initiators 112. Sharing the same connectors as the vehicle controller 104, the RCM 130 signals the pyrotechnic initiators 106 and the pyrotechnic initiators 112 to deploy airbags through the connectors 108 and the connectors 110. In some examples, the RCM controller 126 communicates with other vehicle controllers, such as the vehicle controller 104 and the IMU controller 122. The other vehicle controllers provide data that factor into the airbag deployment decisions. For example, the vehicle controller 104 provides pre-crash data to the RCM controller 126, which allows the RCM 130 to prime the pyrotechnic initiators 106 and the pyrotechnic initiators 112. The vehicle controller 104 and the RCM controller 126 communicate via a direct connection 128 (e.g., printed circuit board (PCB) connection, trace on a PCB). The IMU controller 122 provides processed IMU data from the IMU sensors 120 to the RCM controller 126 (e.g., via a serial peripheral interface (SPI) connection), which supplements the sensor data received by the RCM ASIC 124 in making airbag deployment decisions.

As noted above, integration of the RCM 130 in the vehicle control unit 102 facilitates efficient communication between the vehicle controller 104 and the RCM controller 126 via the direct connection 128. Furthermore, since the RCM 130 and the vehicle controller 104 share the same connectors, a reduction in wiring is achieved.

As illustrated in FIG. 1, the ISM 118 is a separate module that is not included in the same housing as the RCM 130. This provides greater flexibility in the placement of the ISM 118. In some examples, the ISM 118 is placed near the center of the vehicle 602. By placing the ISM 118 near the center of the vehicle 602, acceleration/deceleration is more accurately measured due to the IMU sensors 120 being located closer to the center of mass of the vehicle 602 and due to the IMU sensors 120 capturing a more balanced representation of the motion of the vehicle 602. Thus, the architecture illustrated in FIG. 1 provides for improved sensor placement for more accurate measurements.

Consider an example scenario in which the vehicle 602 is involved in a collision from the rear of the vehicle 602. In this example, the collision is detected through the sensors 114, the sensors 116, and through the IMU sensors 120. The sensor data from the sensors 114 is communicated to the RCM ASIC 124 through the connectors 108. The sensor data from the sensors 116 is communicated to the RCM ASIC 124 through the connectors 110. The sensor data from the IMU sensors 120 is communicated to the RCM ASIC 124 through the connectors 108. Based on the sensor data from the sensors 114, the sensors 116, and the IMU sensors 120, the RCM ASIC 124 and the RCM controller 126 make airbag deployment decisions to, for example, deploy frontal airbags and seat airbags. The airbag deployment decisions are signaled to the pyrotechnic initiators 106 through the connectors 108 and the pyrotechnic initiators 112 through the connectors 110.

Figure 2:
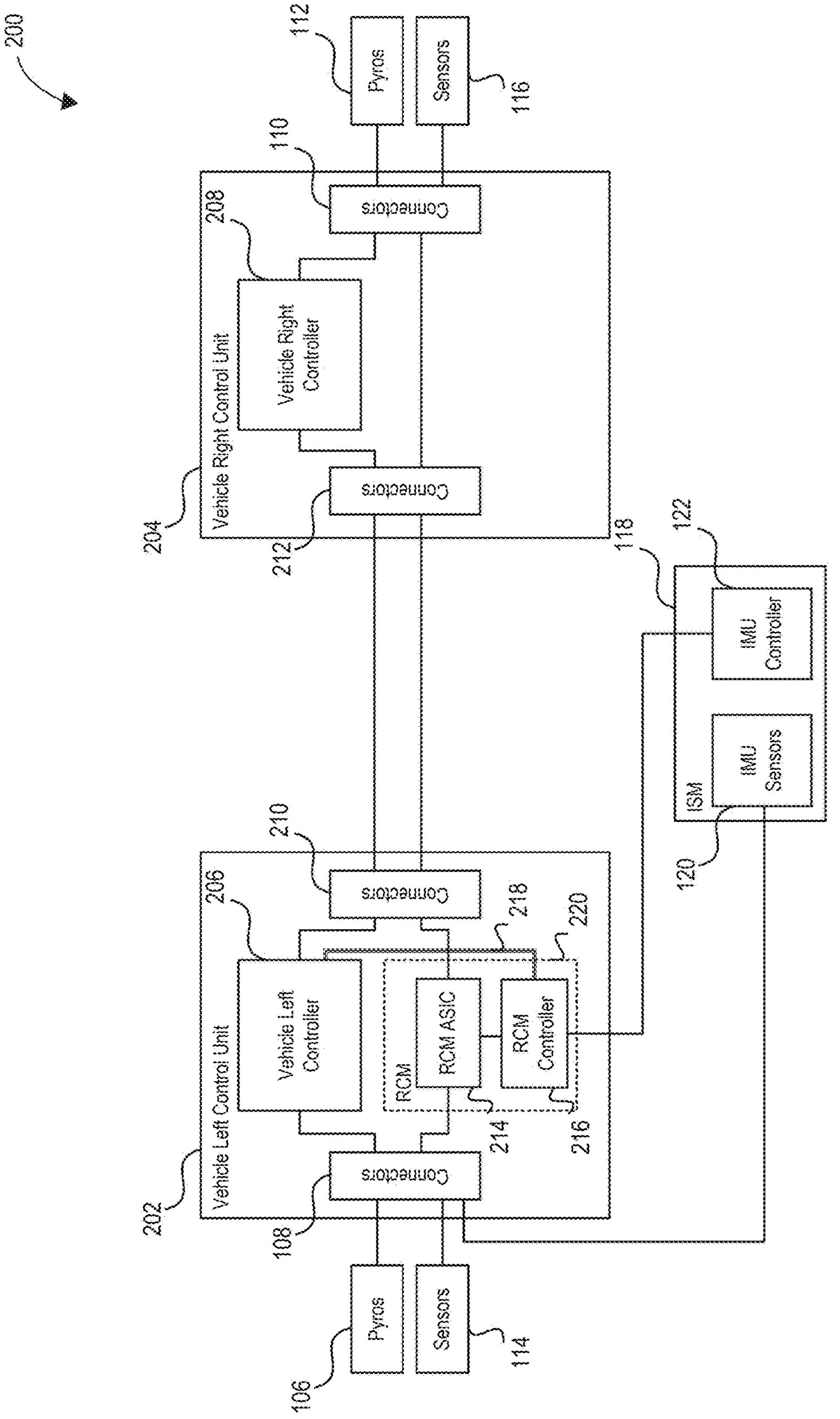
FIG. 2 is a system diagram illustrating an architecture of vehicle controllers with an integrated restraints control module, according to some examples.

FIG. 2 is a block diagram illustrating an architecture 200 of a vehicle control system with an integrated restraints control module, according to some examples. The architecture 200 depicted here can, for example, be included in the vehicle 602 of FIG. 6.

As illustrated in FIG. 2, the architecture 200 includes two vehicle control units, a vehicle left control unit 202 and a vehicle right control unit 3204. These are examples of zonal units, which may for example control different zones of a vehicle. The vehicle left control unit 202 includes a vehicle left controller 206. The vehicle right control unit includes a vehicle right controller 208. In some examples, the vehicle left controller 206 performs various vehicle functions with respect to the left side of the vehicle 602. For example, the vehicle left controller 206 receives and processes sensor data from the sensors 114 on the left side of the vehicle 602. The sensors 114 include, for example, impact sensors on the left side of the vehicle, door pressure sensors on the left side of the vehicle, accelerometers on the left side of the vehicle, proximity sensors on the left side of the vehicle, and cameras on the left side of the vehicle. The vehicle left controller 206 receives data from the sensors 114 through the connectors 108. The vehicle left controller 206 also receives data from the ISM 118. In some examples, the vehicle right controller 208 performs various vehicle functions with respect to the right side of the vehicle 602. For example, the vehicle right controller 208 receives and processes sensor data from the sensors 116 on the right side of the vehicle 602. The sensors 116 include, for example, impact sensors on the right side of the vehicle, door pressure sensors on the right side of the vehicle, accelerometers on the right side of the vehicle, proximity sensors on the right side of the vehicle, and cameras on the right side of the vehicle. The vehicle right controller 208 receives data from the sensors 116 through the connectors 110. The vehicle left controller 206 and the vehicle right controller 208 communicate with each other through connections facilitated by the connectors 210 and the connectors 212. In some examples, the vehicle left controller 206, using data processed and provided by the vehicle right controller 208, facilitates functions of various vehicle systems, such as motor control systems, battery management systems, braking systems, and advanced driver assistance systems. As illustrated here, the vehicle left control unit 202, and the vehicle left controller 206 therein, is connected to the various sensors of the vehicle 602, making the vehicle left control unit 202 a location where integrating an RCM provides the RCM with efficient access to the various sensors of the vehicle 602.

The RCM 220 includes an RCM ASIC 214 and an RCM controller 126. The RCM ASIC 214 receives and processes sensor data from the sensors 114, the sensors 116, and the IMU sensors 120. Sharing the connectors 108 with the vehicle left controller 206, the RCM ASIC 214 receives sensor data from the sensors 114 and the IMU sensors 120 through the connectors 108. The RCM ASIC 214 receives sensor data from the sensors 116 via a connection through the connectors 210, the connectors 212, and the connectors 110, which bypasses the vehicle right controller 208. As illustrated here, the RCM ASIC 214 receives sensor data directly from the sensors 114, the IMU sensors 120, and the sensors 116. For example, the RCM ASIC 124 receives and processes impact data with respect to the left side of the vehicle 602 from the sensors 114, impact data with respect to the right side of the vehicle 602 from the sensors 116, and acceleration/deceleration data from the IMU sensors 120. The RCM controller 216 communicates with other vehicle controllers, such as the vehicle left controller 206, the vehicle right controller 208, and the IMU controller 122 (e.g., via SPI connections). The RCM controller 216 communicates with the vehicle left controller 206 via a direct connection 218 (e.g., PCB connection), which allows data received and processed by the vehicle left controller 206 to be shared with the RCM controller 216. Data provided from the vehicle left controller 206, and the other vehicle controllers, facilitate airbag deployment decisions. The airbag deployment decisions are made by the RCM controller 216 in conjunction with the RCM ASIC 214. The airbag deployment decisions are communicated to airbag systems of the vehicle 602, including pyrotechnic initiators 106 and pyrotechnic initiators 112. For example, signals to deploy airbags on the left side of the vehicle 602 are sent to the pyrotechnic initiators 106 through the connectors 108. Signals to deploy airbags on the right side of the vehicle 602 are sent to the pyrotechnic initiators 112 through the connectors 210, the connectors 212, and the connectors 110, bypassing the vehicle right controller 208. As illustrated here, integration of the RCM 220 in the vehicle left control unit 202, which facilitates the functions of the various vehicle systems, provides the RCM 220 with efficient access to data for making airbag deployment decisions and efficient means for signaling the airbag deployment decisions to the airbag systems.

While FIG. 2 illustrates an architecture with two vehicle control units, the vehicle left control unit 202 and the vehicle right control unit 3204, the principles described herein relating to integration of the RCM 220 are applicable to other architectures with multiple vehicle control units. For example, a vehicle can include four zonal vehicle control units for a front, left, rear, and right of the vehicle. By integrating the RCM 220 with the "main" vehicle control unit, the vehicle control unit that facilitates the functions of the various vehicle systems in the vehicle, the RCM 220 efficiently receives data for making airbag deployment decisions and efficiently signals the airbag deployment decisions to the airbag systems.

As illustrated in FIG. 2, the ISM 118 is a separate module that is not included in the same housing as the RCM 220, allowing the ISM 118 to be placed where the IMU sensors 120 may better measure acceleration/deceleration. Furthermore, even with an architecture with multiple vehicle control units, the separate ISM 118 does not use additional wiring, maintaining an efficient design.

As an example of the above, the vehicle 602 can be involved in a side impact collision from the right side of the vehicle 602. In this example, the side impact collision is detected through side impact sensors in the sensors 116 and through the IMU sensors 120. Accelerometer data from the sensors 114 also contribute to the detection of the side impact collision. The sensor data from the sensors 116 is communicated to the RCM ASIC through the connectors 210, the connectors 212, the vehicle right controller 208, and the connectors 110. The sensor data from the IMU sensors 120 is communicated to the RCM ASIC 214 through the connectors 108. The sensor data from the sensors 116 is communicated to the RCM ASIC 214 through the connectors 108. Based on the sensor data from the sensors 116, the IMU sensors 120, and the sensors 114, the RCM ASIC 214 and the RCM controller 216 make airbag deployment decisions to, for example, deploy airbags on the right side of the vehicle 602. The airbag deployment decisions are signaled to the pyrotechnic initiators 112 through the connectors 210, the connectors 212, the vehicle right controller 208, and the connectors 110.

Figure 3:
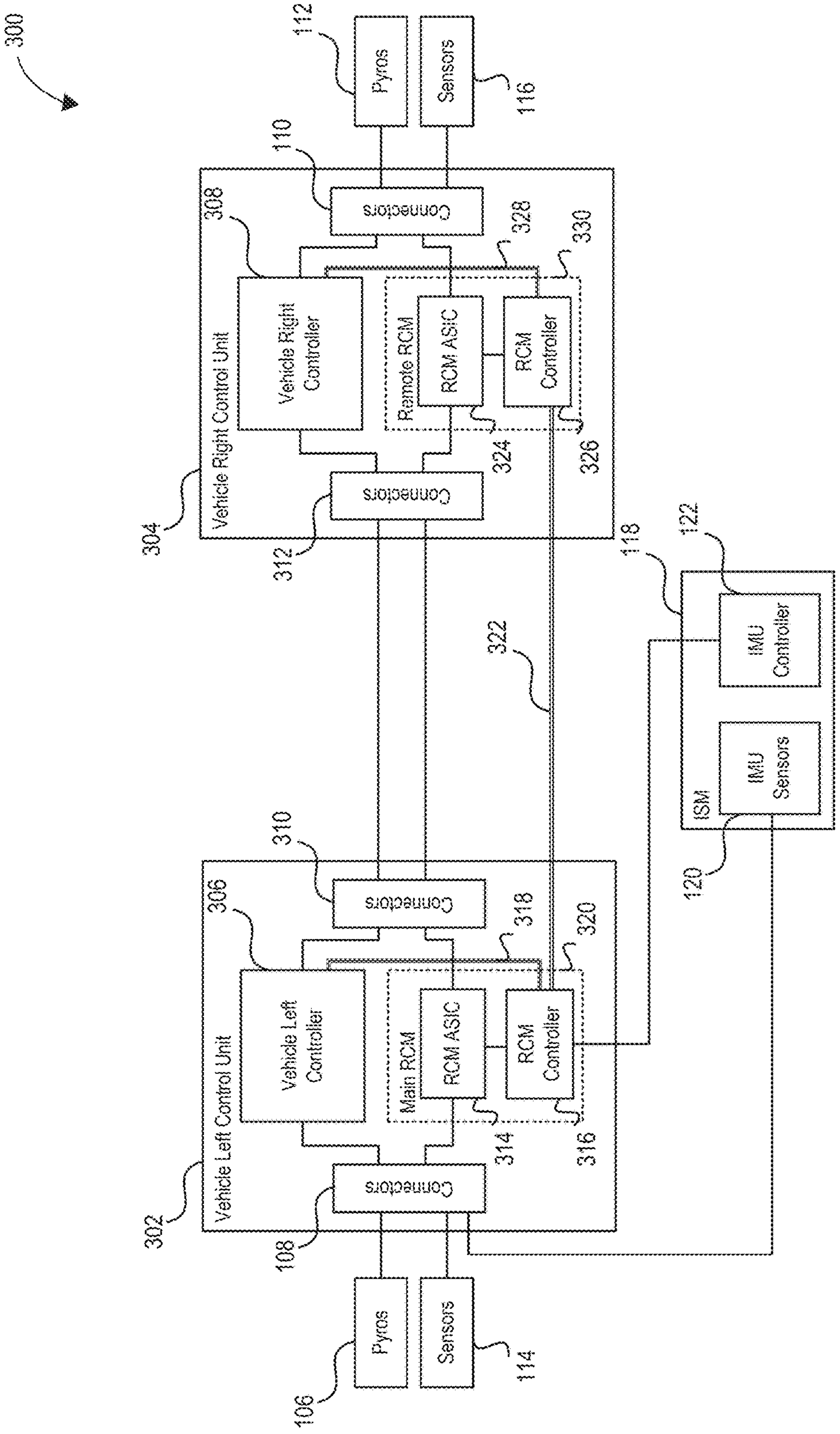
FIG. 3 is a system diagram illustrating an architecture of vehicle controllers with integrated restraints control module, according to some examples.

FIG. 3 is a system diagram illustrating an architecture 300 of vehicle control system with integrated restraints control modules, according to some examples. The architecture 300 depicted here can, for example, be included in the vehicle 602 of FIG. 6. As illustrated in FIG. 3, the architecture 300 includes two vehicle control units, a vehicle control left control unit 302 and a vehicle right control unit 304. The vehicle left control unit 302 includes a vehicle left controller 306. The vehicle right control unit includes a vehicle right controller 308. In some examples, the vehicle left controller 306 receives and processes sensor data from the sensors 114 on the left side of the vehicle 602. The vehicle right controller 308 receives and processes sensor data from the sensors 116 on the right side of the vehicle 602. The vehicle left controller 306 and the vehicle right controller 308 communicate with each other through the connectors 310 and the connectors 312. For example, in facilitating functions of various vehicle systems, the vehicle left controller 306 and the vehicle right controller 308 communicate sensor data from the sensors 114 and the sensors 116 allowing both the vehicle left controller 306 and the vehicle right controller 308 to have access to the sensors data from the sensors 114 and the sensors 116.

As illustrated in FIG. 3, the vehicle left control unit 302 includes a main RCM 320. The vehicle right control unit 304 includes a remote RCM 330. The main RCM 320 includes an RCM ASIC 314 and an RCM controller 316. Similarly, the remote RCM 330 includes an RCM ASIC 324 and an RCM controller 326. In some examples, the RCM ASIC 314 receives sensor data from the sensors 114 and the IMU sensors 120 through the connectors 108. The RCM ASIC 314 receives sensor data from the sensors 116 through the RCM ASIC 324 via connectors 310 and connectors 312. Additionally, or alternatively, the RCM ASIC 314 receives sensor data from the sensors 116 through the RCM ASIC 324 via a high-speed connection 322 (e.g., Ethernet, high-speed communication bus) between the RCM controller 316 and the RCM controller 326. The RCM controller 316 communicates with other vehicle controllers, including the RCM controller 326. The RCM controller 316 and the RCM controller 326 can communicate over the high-speed connection 322. The RCM controller 316 communicates with the vehicle left controller 306 via a direct connection 318 (e.g., PCB connection), which allows data received and processed by the vehicle left controller 306 to be shared with the RCM controller 316. The RCM ASIC 324 receives sensor data from the sensors 116 through the connectors 110. The RCM ASIC 324 receives sensor data from the sensors 114 and the IMU sensors 120 through the RCM ASIC 314 via the connectors 310 and the connectors 312. Additionally, or alternatively, the RCM ASIC 324 receives sensor data from the sensors 114 and the IMU sensors 120 through the RCM ASIC 314 via the high-speed connection 322 between the RCM controller and the RCM controller 326. The RCM controller 326 communicates with other vehicle controllers, including the RCM controller 316. The RCM controller 326 communicates with the vehicle right controller 308 via a direct connection 328 (e.g., PCB connection), which allows data received and processed by the vehicle right controller 308 to be shared with the RCM controller 326. The RCM controller 316 and the RCM controller 326 can communicate over the high-speed connection 322.

In some examples, the RCM ASIC 314 in conjunction with the RCM controller 316 make airbag deployment decisions for the left side of the vehicle 602, such as for driver side frontal airbags and for left side airbags. As the main RCM 320, the RCM ASIC 314 in conjunction with the RCM controller 316 make airbag deployment decisions for the middle of the vehicle 602, such as for center airbags. For example, the airbag deployment decisions from the main RCM 320 are sent to the pyrotechnic initiators 106 through the connectors 108. In some examples, the RCM ASIC 324 in conjunction with the RCM controller 326 make airbag deployment decisions for the right side of the vehicle 602, such as for passenger side frontal airbags and for right side airbags. For example, the airbag deployment decisions from the remote RCM 330 are sent to the pyrotechnic initiators 112 through the connectors 110. In some examples, the main RCM 320 and the remote RCM 330 communicate via the high-speed connection 322 to make airbag deployment decisions. For example, an impact on the right side of the vehicle 602 can cause the remote RCM 330 to deploy airbags on the right side of the vehicle 602. The remote RCM 330 signals to the pyrotechnic initiators 112 to deploy these airbags. In this example, the remote RCM 330 and the main RCM 320 communicate via the high-speed connection 322 to make airbag deployment decisions with respect to the left side of the vehicle 602 and the middle of the vehicle 602. The main RCM 320 and the remote RCM 330, based on the severity of the impact on the right side of the vehicle 602 can signal the pyrotechnic initiators 106 to deploy airbags on the left side of the vehicle 602 and in the middle of the vehicle 602. Furthermore, the main RCM 320 and the remote RCM 330 can communicate to provide redundancy in airbag deployment decisions. The main RCM 320 checks airbag deployment decisions made by the remote RCM 330 and vice versa to ensure safe and accurate deployment of airbags. In some examples, the main RCM 320 determines whether the remote RCM 330 is faulted and vice versa. If the main RCM 320 determines the remote RCM 330 is faulted, the main RCM 320 takes over functionality of the remote RCM 330. If the remote RCM 330 determines the main RCM 320 is faulted, the remote RCM 330 takes over functionality of the main RCM 320. As illustrated here, integration of the main RCM 320 in the vehicle left control unit 302 and integration of the remote RCM 330 in the vehicle right control unit 304 efficiently allocates airbag deployment decisions across the vehicle control units of the vehicle 602. Sensor data from the sensors 114 and the IMU sensors 120 are efficiently communicated with the main RCM 320 through the connectors 108, and airbag deployment decisions are efficiently communicated from the main RCM 320 to the pyrotechnic initiators 106 through the connectors 108. Sensor data from the sensors 116 are efficiently communicated with the remote RCM 330 through the connectors 110, and airbag deployment decisions are efficiently communicated from the remote RCM 330 to the pyrotechnic initiators through the connectors 110. Furthermore, by coordinating over the high-speed connection 322, the main RCM 320 and the remote RCM 330 effectively control the airbag deployment decisions for the entire vehicle 602 and provide safety-improving redundancy.

While FIG. 3 illustrates an architecture with two vehicle control units, the vehicle left control unit 302 and the vehicle right control unit 304, the principles described herein relating to integration of the main RCM 320 and the remote RCM 330 are applicable to other architectures with multiple vehicle control units. For example, a vehicle can include four zonal vehicle control units for a front, left, rear, and right of the vehicle. By integrating the main RCM 320 with the "main" vehicle control unit, the vehicle control unit that facilitates the functions of the various vehicle systems in the vehicle, the main RCM 320 efficiently receives data for making airbag deployment decisions and efficiently signals the airbag deployment decisions to the airbag systems. Remote RCMs can be integrated with the other vehicle control units to efficiently allocate airbag deployment decisions across the RCMs.

As illustrated in FIG. 3, the ISM 118 is a separate module that is not included in the same housing as the main RCM 320 or the remote RCM 330, allowing the ISM 118 to be placed where the IMU sensors 120 accurately measures acceleration/deceleration. Furthermore, even with an architecture with multiple vehicle control units and multiple RCMs, the separate ISM 118 does not use additional wiring, maintaining an efficient design.

Figure 4:
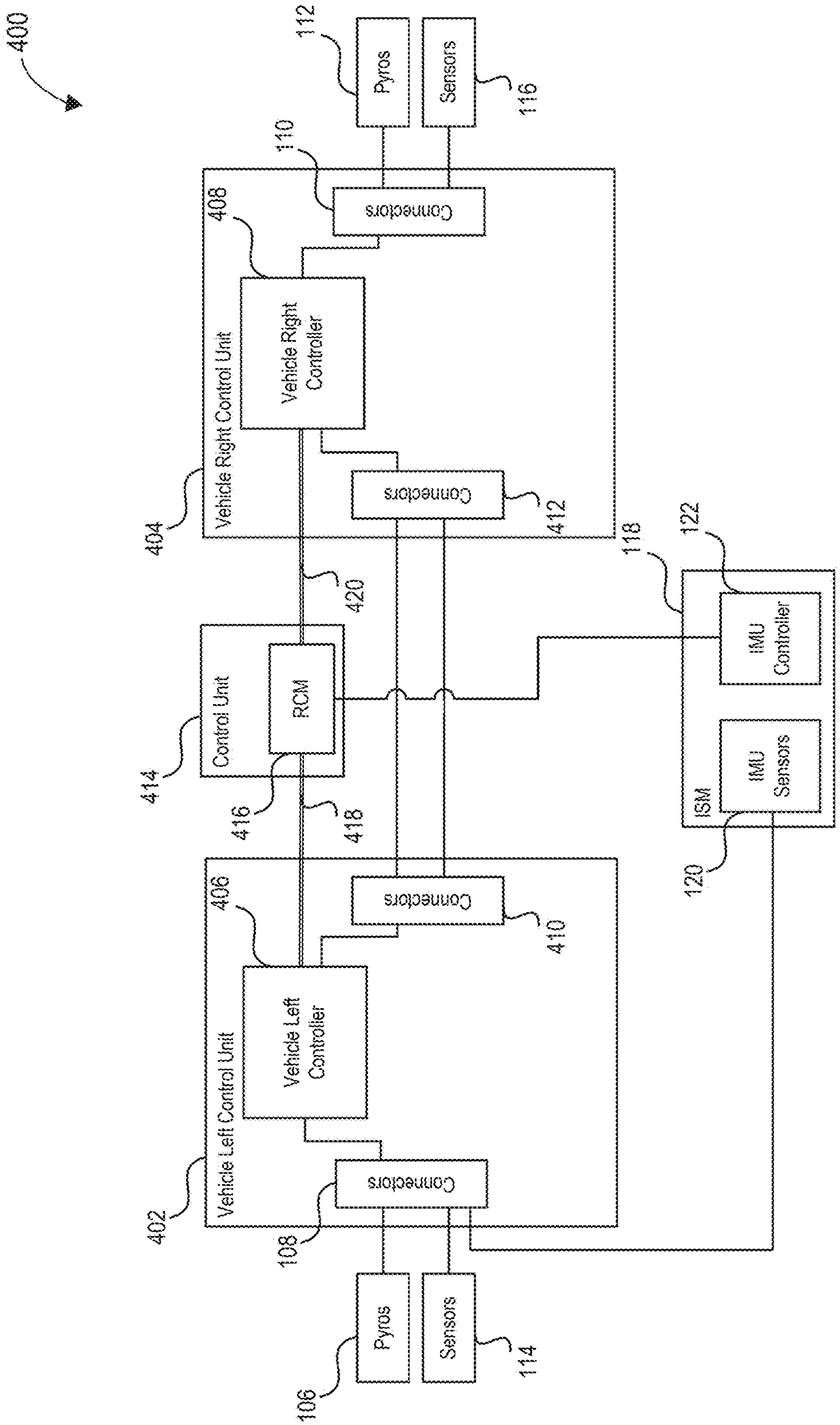
FIG. 4 is a system diagram illustrating an architecture of vehicle controllers with a stand-alone restraints control module, according to some examples.

FIG. 4 is a system diagram illustrating an architecture 400 of vehicle controllers with a stand-alone restraints control module, according to some examples. The architecture 400 depicted here can, for example, be included in the vehicle 602 of FIG. 6. As illustrated in FIG. 4, the architecture includes two vehicle control units, a vehicle left control unit 402 and a vehicle right control unit 404. The vehicle left control unit 402 includes a vehicle left controller 406. The vehicle right control unit 404 includes a vehicle right controller 408. In some examples, the vehicle left controller 406 receives and processes sensor data from the sensors 114 on the left side of the vehicle 602 and the IMU sensors 120 through the connectors 108. The vehicle right controller receives and processes sensor data from the sensors 116 on the right side of the vehicle 602 through the connectors 110. The vehicle left controller 406 and the vehicle right controller 408 communicate with each other through the connectors 410 and the connectors 412. For example, in facilitating functions of various vehicle systems, the vehicle left controller 406 and the vehicle right controller 408 communicate sensor data from the sensors 114 and the sensors 116 allowing both the vehicle left controller 406 and the vehicle right controller 408 to have access to the sensors data from the sensors 114, the sensors 116, and the IMU sensors 120.

As illustrated in FIG. 4, an RCM 416 is included in a control unit 414 separate from the vehicle left control unit 402, the vehicle right control unit 404, and the ISM 118. Here, the RCM 416 receives sensors data from the sensors 114, the sensors 116, and the IMU sensors 120 through the vehicle left controller 406, the vehicle right controller 408, and the IMU controller 122. The RCM 416 makes airbag deployment decisions based on the sensor data received from the sensors 114, the sensors 116, and the IMU sensors 120. The RCM 416 communicates with other vehicle controllers, including the vehicle left controller 406, the vehicle right controller 408, and the IMU controller 122 to facilitate the airbag deployment decisions. The RCM 416 communicates with the other vehicle controllers through high-speed connections (e.g., Ethernet, high-speed communication bus), such as the high-speed connection 518 and the high-speed connection 520 to the vehicle left controller 406 and the vehicle right controller 408. The airbag deployment decisions are signaled to the pyrotechnic initiators 106 and the pyrotechnic initiators 112 through the vehicle left controller 406 and the vehicle right controller 408. For example, the vehicle 602 can be involved in a side impact collision from the left side of the vehicle 602. In this example, the side impact collision is detected through side impact sensors in the sensors 114, accelerometer data from the sensors 116, and through the IMU sensors 120. The sensor data from the sensors 114 is communicated to the RCM 416 through the vehicle left controller 406. The sensor data from the IMU sensors 120 is communicated to the RCM 416 through the IMU controller 122. The sensor data from the sensors 116 is communicated to the RCM 416 through the vehicle right controller 408. Based on the sensor data, the RCM 416 makes airbag deployment decisions to deploy airbags on the left side of the vehicle 602. The airbag deployment decisions are signaled to the pyrotechnic initiators 106 through the vehicle left controller 406. As illustrated here, the RCM 416 can be separated as a stand-alone device by routing sensor data and airbag deployment decisions through high-speed connections with other vehicle control units. In this architecture, the RCM 416 can be flexibly located in the vehicle 602 while reducing wiring in the architecture.

While FIG. 4 illustrates an architecture with two vehicle control units, the vehicle left control unit 402 and the vehicle right control unit 404, the principles described herein relating to the RCM 416 as a stand-alone device are applicable to other architectures with multiple vehicle control units. For example, a vehicle can include four vehicle control units for a front, left, rear, and right of the vehicle. As the RCM 416 is a stand-alone device, the RCM 416 efficiently performs its functions through high-speed connections with the four vehicle control units. Also, as illustrated in FIG. 4, the ISM 118 remains a separate module that is not included in the same housing as the RCM 416, allowing the ISM 118 to be placed where the IMU sensors 120 accurately measure acceleration/deceleration. Furthermore, even with an architecture with multiple vehicle control units, the separate ISM 118 does not use additional wiring, maintaining an efficient design.

Figure 5:
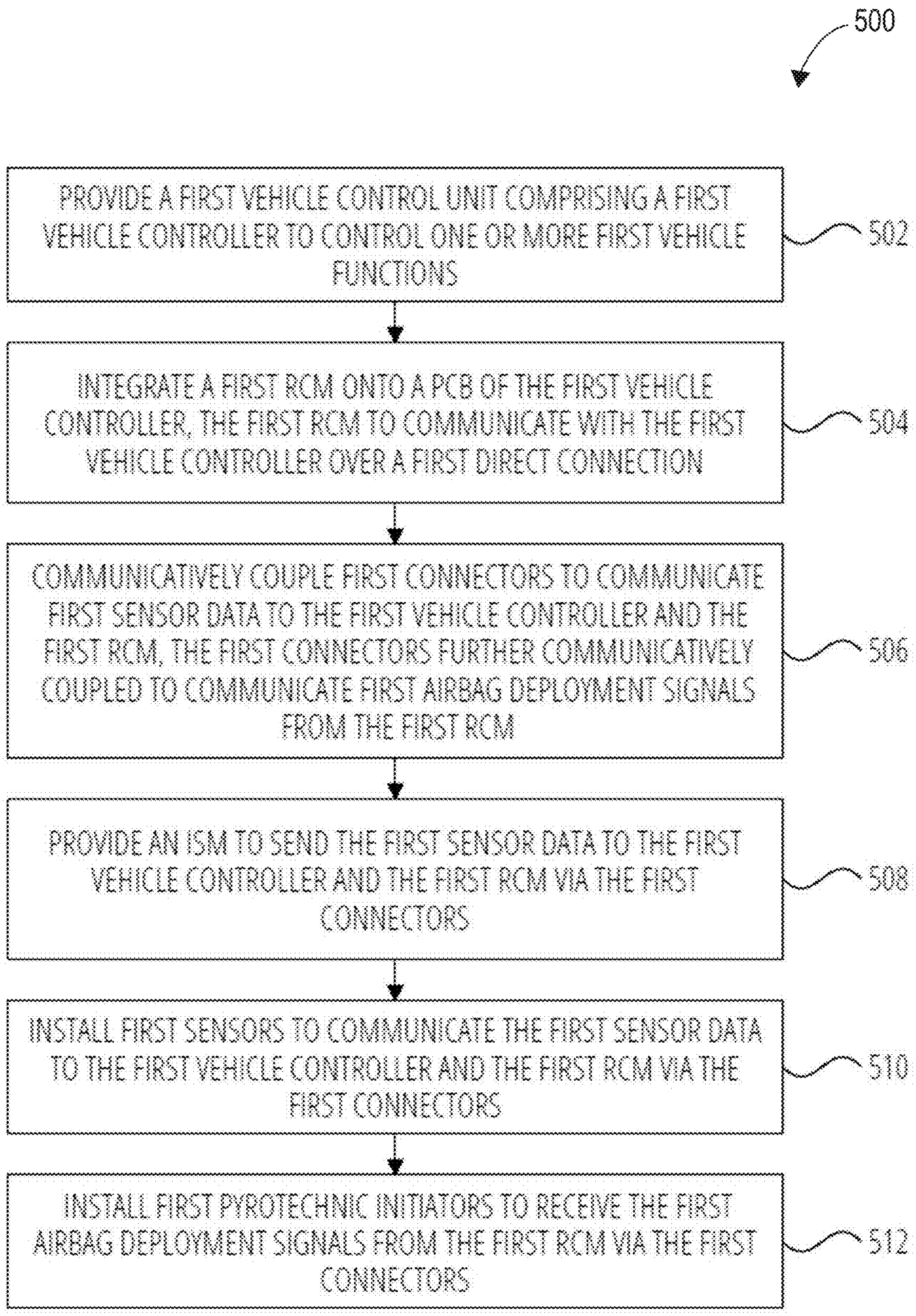
FIG. 5 is a flow chart illustrating a method of manufacturing a vehicle, according to some examples.

FIG. 5 is a flow chart illustrating a method 500 of manufacturing a vehicle, according to some examples. The method 500 illustrates example operations that may be performed in manufacturing a vehicle, such as the vehicle 602 of FIG. 6, with one or more RCMS integrated with one or more vehicle control units. Although the method 500 depicts a particular sequence of operations, the sequence may be altered without departing from the scope of the present disclosure. For example, some of the operations depicted may be performed in parallel or in a different sequence that does not materially affect the function of the method 500.

At operation 502, the method 500 provides a first vehicle control unit comprising a first vehicle controller to control one or more first vehicle functions. At operation 504, the method 500 integrates a first RCM onto a PCB of the first vehicle controller, the first RCM to communicate with the first vehicle controller over a first direct connection. At operation 506, the method 500 communicatively couples first connectors to communicate first sensor data to the first vehicle controller and the first RCM, the first connectors further communicatively coupled to communicate first airbag deployment signals from the first RCM. At operation 508, the method 500 provides an ISM to send the first sensor data to the first vehicle controller and the first RCM via the first connectors. At operation 510, the method 500 installs first sensors to communicate the first sensor data to the first vehicle controller and the first RCM via the first connectors. At operation 512, the method 500 installs first pyrotechnic initiators to receive the first airbag deployment signals from the first RCM via the first connectors.

Figure 6:
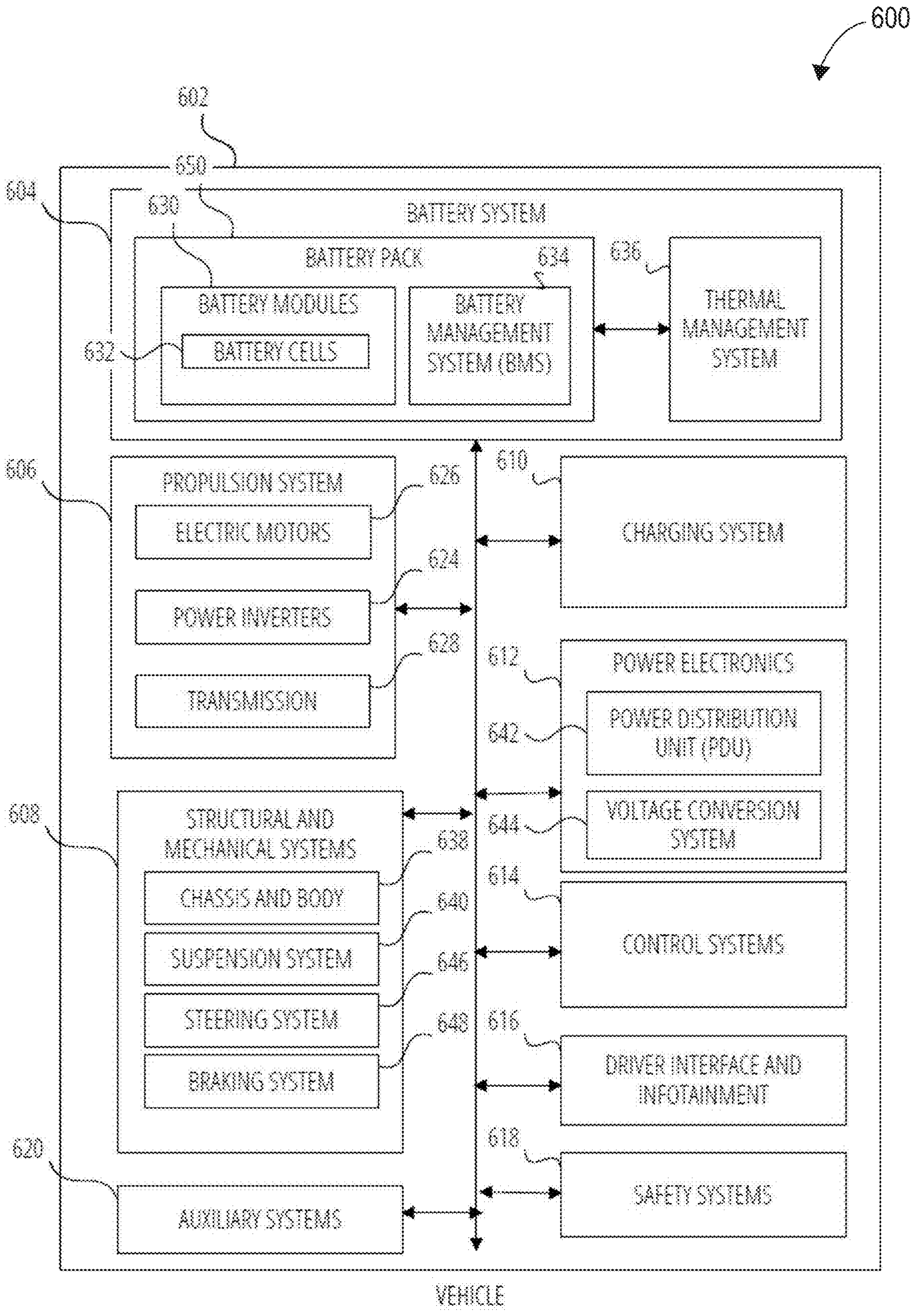
FIG. 6 is a system diagram illustrating an architecture of an electric vehicle (EV), according to some examples.

FIG. 6 is a system diagram illustrating an architecture 600 of an electric vehicle (EV) 602, according to some examples. This diagram shows systems and sub-systems that collectively enable the functionality and operational efficiency of the electric vehicle 602.

The vehicle 602 includes a number of higher-level systems which are interconnected, including a battery system 604, a propulsion system 606, structural and mechanical systems 608, a charging system 610, power electronics 612, control systems 614, driver interface and infotainment 616, safety systems 618, and auxiliary systems 620.

The propulsion system 622 includes one or more electric motors 626, which may include traction motors for propulsion and motors for regenerative braking systems, convert electrical energy into mechanical energy. Power inverters 624, facilitate the conversion of DC power from the battery to AC power required by the electric motors 626. The propulsion system also includes a transmission 628, which may consist of a single-speed transmission or gearbox, channeling mechanical power to the vehicle's wheels.

The battery system 604 is composed of battery packs 650, each having several battery modules 630, each housing multiple battery cells 632. These battery cells 632 may be based on various chemistries, including lithium-ion, lithium-polymer, or solid-state materials, each offering distinct advantages in terms of energy density, recharge cycles, and safety profiles.

A battery management system (BMS) 634 continuously monitors various parameters, such as voltage, current, and temperature of each of the battery cells 632 and battery modules 630, to prevent conditions that could lead to overcharging, deep discharging, or thermal runaway. The battery management system (BMS) 634 also manages the state of charge (SoC) and state of health (SoH) of the battery, ensuring that the energy is distributed during discharge and that the charging process is optimized for longevity and safety. Each battery management system (BMS) 634 employs algorithms to balance the charge across the cells and modules, correcting imbalances that can reduce the battery's overall capacity and lifespan.

Integrated with the battery system 604 is a thermal management system 636, which operatively maintains the battery cells 632 within specified temperature ranges. The thermal management system 636 employs temperature sensors to monitor the heat generated by the battery cells 632 during operation. Based on the data collected, it activates cooling and heating mechanisms to regulate the battery's temperature. Cooling methods can include air cooling, where ambient air is circulated around the battery modules, or liquid cooling, where a coolant is circulated through channels in or around the battery modules to absorb and dissipate heat. In colder environments, the thermal management system 636 may employ heating elements or use waste heat from the vehicle's systems to warm the battery cells, ensuring they operate efficiently even in low temperatures.

The charging system 610 operatively replenishes the stored energy within the battery system 604 of the electric vehicle 602. It supports various charging methodologies to ensure flexibility and convenience in energy restoration. The charging system 610 may encompass systems for both standard (Level 1 and Level 2) and fast charging (DC fast charging), facilitating a range of charging speeds to suit different user needs and infrastructure capabilities.

For standard charging, the charging system 610 includes an onboard charger for AC/DC conversion. This onboard charger converts the alternating current (AC) from the electrical grid or home outlets into direct current (DC) that can be stored in the vehicle's battery system 604. The onboard charger may, for example support Level 1 and Level 2 charging, with Level 1 charging using standard household outlets (108-120V) and Level 2 charging requiring a higher voltage source (208-240V), such as those found in dedicated charging stations or installed in residential garages.

For fast charging, the charging system 610 may incorporate a DC fast charging system, designed for rapid energy transfer directly to the vehicle's battery system 604, bypassing the onboard charger. DC fast charging stations supply high-voltage (e.g., 400V to 800V) direct current directly to the battery system 604.

Additionally, the electric vehicle 602 may be equipped with an auxiliary battery, such as a 12V lead-acid or lithium-ion battery may be tasked with powering the vehicle's low-voltage systems, including lighting, infotainment, electronic control units, and other ancillary components, ensuring their operation even when the main battery system is off or during the initial stages of charging when the main system's voltage might be too low for these tasks. This separation of power sources enhances the vehicle's electrical system reliability and ensures the availability of essential functions.

Structural and mechanical systems 608, including a chassis and body 138 and suspension system 140, provide the physical framework and support for the vehicle 602. The chassis and body 138 constitute the vehicle's primary structure, while the suspension system 140, which may include springs, shock absorbers (or dampers), and control arms, to provide a smooth and stable ride by mitigating road shocks and vibrations.

Power electronics 612, including a power distribution unit (PDU) 642 and a voltage conversion system 644, are responsible for the management and conversion of electrical power within the vehicle. The power distribution unit (PDU) 642, equipped with fuses and relays, distributes power to various vehicle systems, while voltage conversion devices of the voltage conversion system 644, such as DC/DC and AC/DC converters, adjust the voltage levels to meet the specific requirements of different components.

Control systems 614 facilitate the driver's command over the vehicle, with a steering system 646 and a braking system 648 as examples. The steering system 646, including a power steering motor, allows for precise directional control, whereas the braking system 648, which may feature disc brakes and an anti-lock braking system (ABS), enables deceleration and stopping.

The driver interface and infotainment 616 supports the driving experience by providing vehicle information and entertainment options through digital displays and multimedia systems. Connectivity features, such as Bluetooth and USB, further augment functionality.

Safety systems 618, designed to protect the vehicle's occupants, may include airbag systems and advanced driver-assistance systems (ADAS), for example. Airbag systems may include frontal airbags (e.g., driver side frontal airbags, passenger side frontal airbags) that deploy from the steering wheel and dashboard to protect the driver and the front passenger in head-on collisions. Airbag systems may include side airbags, such as torso airbags and curtain airbags, that protect the driver and passengers in side impacts and rollovers. Torso airbags inflate from the seat or door panel to shield the chest and abdomen. Curtain airbags deploy from the roof lining to protect the head. Airbag systems may include knee airbags, which are located under the steering column and glove compartment, that safeguard lower limbs from dashboard impacts during a collision. Airbag systems may include center airbags that deploy between the driver and the front passenger to prevent the driver and the front passenger from hitting each other during a collision. Airbag systems may include rear airbags, including rear-center and rear-window airbags that protect rear seat passengers. Airbag systems may include seatbelt airbags, which are integrated into seatbelts, and provide cushioning evenly across the body during a collision. Airbag systems may include seat airbags that deploy from the seats to protect the torso, head, or both during a collision. Restraint control modules (RCMs) responsible for deploying airbag systems independently determine whether airbag deployment is necessary and whether airbag deployment is safe. Airbag deployment can be determined to be unnecessary if a seat is unoccupied. Airbag deployment can be determined to be unsafe if a seat is occupied by a small child. In some instances, airbag deployment can be determined to be unsafe based on the orientation and the speed of the vehicle 602. The determinations for whether airbag deployment is necessary and whether airbag deployment is safe are based on sensor data received by the RCMs, which analyze the sensor data and make deployment decisions accordingly.

In the event of a collision, an airbag system uses a pyrotechnic initiator to trigger inflation of an airbag. The pyrotechnic initiator may include an electrical conductor with a combustible material. Upon activation, the pyrotechnic initiator ignites a chemical propellant that decomposes rapidly to produce gas to inflate the airbag. The expanding gas produced by the chemical propellant forces the airbag out of its storage compartment (e.g., behind the steering wheel, behind the dashboard panel) as the airbag becomes fully inflated. The airbag then begins to deflate quickly through small vent holes in the airbag, providing an energy-absorbing cushion for the driver or the passenger.

ADAS may use an array of sensors, cameras, radar, LiDAR, and/or ultrasonic devices to monitor the vehicle's surroundings, detect potential hazards, and execute or suggest corrective actions to prevent accidents and mitigate their impact.

ADAS can be categorized into different levels of self-driving capabilities, ranging from Level 0, where the human driver performs all driving tasks, to Level 5, which represents full automation with no human intervention required under any circumstances. Levels 1 and 2 focus on driver assistance and partial automation, respectively, where systems such as adaptive cruise control, lane-keeping assistance, and automatic emergency braking support the driver but do not replace them. Level 3, conditional automation, allows the vehicle to handle all aspects of driving in certain conditions, but requires the driver to be ready to take control when needed. Level 4, high automation, enables the vehicle to operate independently in most scenarios, though human override is still possible.

Examples of ADAS that contribute to these levels of automation include, but are not limited to, adaptive cruise control, which adjusts the vehicle's speed to maintain a safe distance from vehicles ahead; lane departure warning systems, which alert the driver when the vehicle begins to drift out of its lane; and automatic parking systems, which assist or take over control of the vehicle during parking maneuvers. More advanced systems, contributing to higher levels of automation, involve complex algorithms and machine learning capabilities to interpret sensor data, predict actions of other road users, and make real-time driving decisions.

ADAS can be used in conjunction with airbag systems to prime airbags in preparation for an impending collision. By using the vehicle's sensors to monitor the vehicle's surroundings, ADAS detects potential crash situations and initiates a priming process to prepare an airbag for deployment. ADAS can detect potential crash situations based on information including position and movement of detected objects, predicted trajectories of the detected objects, masses of the detected objects, a direction in which a potential collision may occur, a speed of the potential collision, a severity of the potential collision, masses of the detected objects, etc. The information can be determined based on sensor data. The priming process includes sending a small electrical current to the pyrotechnic initiator of the airbag to heat the pyrotechnic initiator and ready the pyrotechnic initiator for immediate activation. As the pyrotechnic initiator is heated and ready for activation, the airbag is deployed more quickly in the event of a collision than if the pyrotechnic initiator is not heated and ready for activation. In the event that a potential crash situation is detected but a collision does not occur, the priming processes ceases, allowing the pyrotechnic initiator to return to a normal ready state.

Auxiliary systems 620 support the vehicle's functions and occupant comfort, with climate control and lighting systems as examples. The auxiliary systems 620 may also include windshield wipers etc.

As noted above, the systems of the vehicle 602 are communicatively connected. Communications between the interconnected systems within vehicle 602 are facilitated through a vehicle network architecture, employing both hardware and software components to ensure seamless data exchange and coordination. This network architecture may include one or more vehicle communication buses, such as for example Controller Area Network (CAN), Local Interconnect Network (LIN), FlexRay, and Ethernet, which serve as the backbone for intra-vehicle communications.

The Controller Area Network (CAN) bus is a vehicle bus standard designed to allow microcontrollers and devices to communicate with each other within the vehicle 602 without a host computer. Such a network may support control communications between systems such as the battery system 604, propulsion system 606, and control systems 614, due to its high reliability and resistance to interference. A CAN bus may support messages that ensure real-time control and monitoring of these systems.

For other communications, such as those involving the driver interface and infotainment 616 or auxiliary systems 620, a Local Interconnect Network (LIN) bus may be employed. LIN may provide a cost-effective, low-speed serial communication system for connecting intelligent sensors and actuaries. It may serve as a sub-network to the CAN bus, handling signals such as switch inputs and actuator outputs.

FlexRay technology offers a higher data rate compared to CAN and LIN, providing the necessary bandwidth for advanced control systems, including those required for autonomous driving functionalities within safety systems 618. Its deterministic nature and fault tolerance make it suitable for applications that require precise timing and synchronization, such as coordinating the actions of multiple control units in real-time.

Ethernet, with its high data transfer rate, may for example be adopted for diagnostics and infotainment applications within the vehicle 602. It supports the rapid transfer of large volumes of data, making it well suited for advanced driver assistance systems (ADAS), software updates, and multimedia streaming in the driver interface and infotainment 616 system.

Software protocols and application programming interfaces (APIs) built on top of these physical layers enable high-level communication and data exchange between systems. These protocols may define the rules for data format, timing, and error handling, ensuring that messages are correctly interpreted and acted upon by the receiving systems.

Other technical features may be readily apparent to one skilled in the art from the figures, descriptions, and claims herein.

EXAMPLES

In view of the disclosure above, various examples are set forth below. It should be noted that one or more features of an example, taken in isolation or combination, should be considered within the disclosure of this application.

Example 1 is a system comprising: a first vehicle control unit comprising: a first vehicle controller to control one or more first vehicle functions; a first restraint control module (RCM) to communicate with the first vehicle controller over a first direct connection; and first connectors to communicate first sensor data to the first vehicle controller and the first RCM, the first connectors further to communicate first airbag deployment signals from the first RCM; an inertia sensing module (ISM) to send the first sensor data to the first vehicle controller and the first RCM via the first connectors; first sensors to communicate the first sensor data to the first vehicle controller and the first RCM via the first connectors; and first pyrotechnic initiators to receive the first airbag deployment signals from the first RCM via the first connectors.

In Example 2, the subject matter of Example 1 includes wherein the first RCM comprises: a first RCM application specific integrated circuit (ASIC) to process the first sensor data; and a first RCM controller to communicate with the first vehicle controller, wherein the first airbag deployment signals are generated based on the first RCM ASIC and the first RCM controller.

In Example 3, the subject matter of Examples 1-2 includes wherein the ISM comprises: inertia measuring unit (IMU) sensors to measure acceleration and deceleration; and an IMU controller to communicate with the first RCM, wherein the first airbag deployment signals are generated based on a communication between the first RCM and the IMU controller.

In Example 4, the subject matter of Examples 1-3 includes wherein the first airbag deployment signals are generated based on a communication between the first RCM and the first vehicle controller.

In Example 5, the subject matter of Examples 1-4 includes wherein the first direct connection is a printed circuit board (PCB) connection.

In Example 6, the subject matter of Examples 1-5 includes a second vehicle control unit comprising: a second vehicle controller to control one or more second vehicle functions; and second connectors to communicate second sensor data to the second vehicle controller; and second sensors to communicate the second sensor data to the second vehicle controller.

In Example 7, the subject matter of Example 6 includes wherein the first RCM is further to communicate with the second vehicle controller, and wherein the first airbag deployment signals are generated based on a communication between the first RCM and the second vehicle controller.

In Example 8, the subject matter of Examples 6-7 includes wherein the first RCM is further to receive the second sensor data via the second vehicle controller.

In Example 9, the subject matter of Examples 6-8 includes second pyrotechnic initiators to receive second airbag deployment signals from the first RCM through the second vehicle controller.

In Example 10, the subject matter of Examples 6-9 includes wherein the first vehicle functions are associated with a first side of a vehicle, and wherein the second vehicle functions are associated with a second side of the vehicle.

In Example 11, the subject matter of Examples 6-10 includes wherein the second vehicle control unit further comprises: a second RCM to communicate with the second vehicle controller over a second direct connection.

In Example 12, the subject matter of Example 11 includes wherein the first RCM is further to control airbag deployment for first airbag systems of a first side of a vehicle, and wherein the second RCM is further to control airbag deployment for second airbag systems of a second side of the vehicle.

In Example 13, the subject matter of Examples 11-12 includes wherein the first RCM is further to receive the second sensor data via the second RCM, and wherein the second RCM is further to receive the first sensor data via the first RCM.

In Example 14, the subject matter of Examples 11-13 includes wherein the first airbag deployment signals are generated based on a communication between the first RCM and the second RCM.

In Example 15, the subject matter of Examples 11-14 includes second pyrotechnic initiators to receive second airbag deployment signals from the second RCM through the second vehicle controller, wherein the second airbag deployment signals are generated based on a communication between the first RCM and the second RCM.

Example 16 is a system comprising: a first vehicle control unit comprising: a first vehicle controller to control one or more first vehicle functions; first connectors to communicate first sensor data to the first vehicle controller; a restraint control module (RCM) to communicate with the first vehicle controller; an inertia sensing module (ISM) to send the first sensor data to the first vehicle controller via the first connectors; first sensors to communicate the first sensor data to the first vehicle controller via the first connectors; and first pyrotechnic initiators to receive first airbag deployment signals via the first connectors.

In Example 17, the subject matter of Example 16 includes wherein the RCM is further to receive the first sensor data via the first vehicle controller, and wherein the RCM is further to send the first airbag deployment signals via the first vehicle controller.

In Example 18, the subject matter of Examples 16-17 includes a second vehicle control unit comprising: a second vehicle controller to control one or more second vehicle functions; second connectors to communicate second sensor data to the second vehicle controller; second sensors to communicate the second sensor data to the second vehicle controller via the second connectors; and second pyrotechnic initiators to receive second airbag deployment signals via the second connectors.

In Example 19, the subject matter of Example 18 includes wherein the RCM is further to receive the second sensor data via the second vehicle controller, and wherein the RCM is further to send the second airbag deployment signals via the second vehicle controller.

Example 20 is a method of manufacturing a vehicle, the method comprising: providing a first vehicle control unit comprising a first vehicle controller to control one or more first vehicle functions; integrating a first restraint control module (RCM) onto a printed circuit board (PCB) of the first vehicle controller, the first RCM to communicate with the first vehicle controller over a first direct connection; communicatively coupling first connectors to communicate first sensor data to the first vehicle controller and the first RCM, the first connectors further communicatively coupled to communicate first airbag deployment signals from the first RCM; providing an inertia sensing module (ISM) to send the first sensor data to the first vehicle controller and the first RCM via the first connectors; installing first sensors to communicate the first sensor data to the first vehicle controller and the first RCM via the first connectors; and installing first pyrotechnic initiators to receive the first airbag deployment signals from the first RCM via the first connectors.

It should be noted that the description and the figures above merely illustrate the principles of the present subject matter along with examples described herein and should not be construed as a limitation to the present subject matter. It is thus understood that various arrangements may be devised that although not explicitly described or shown herein, embody the principles of the present subject matter. Moreover, all statements herein reciting principles, aspects, and implementations of the present subject matter, as well as specific examples thereof, are intended to encompass equivalents thereof.

It is to be understood that not necessarily all objects or advantages may be achieved in accordance with any particular example described herein. Thus, for example, those skilled in the art will recognize that some examples may be operated in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes computers or processors. The code modules may be stored in any type of non-transitory computer-readable medium or other computer storage device. Some or all of the methods may be embodied in specialized computer hardware.

Many other variations than those described herein will be apparent from this disclosure. For example, depending on the example, some acts, events, or functions of any of the algorithms described herein can be performed in a different sequence, can be added, merged, or left out altogether (for example, not all described acts or events are necessary for the practice of the algorithms). Moreover, in some examples, acts or events can be performed concurrently, for example, through multi-threaded processing, interrupt processing, or multiple processors or processor cores, or on other parallel architectures, rather than sequentially. In addition, different tasks or processes can be performed by different machines and/or computing systems that can function together.

The various illustrative logical blocks and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combination of the same, or the like. A processor can include electrical circuitry to process computer-executable instructions. In some examples, a processor includes an FPGA or other programmable device that performs logic operations without processing computer-executable instructions. A processor can also be implemented as a combination of computing devices, for example, a combination of a DSP and a microprocessor, a plurality of microprocessors, microprocessors in conjunction with a DSP core, or any other such configuration.

Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few. The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Although the described flow diagrams herein can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Conditional language such as, among others, “can,” “could,” “might” or “may,” unless specifically stated otherwise, are otherwise understood within the context as used in general to convey that some examples include, while other examples do not include, some features, elements and/or steps. Thus, such conditional language is not generally intended to imply that features, elements and/or steps are in any way for examples or that examples necessarily include logic for deciding, with or without user input or prompting, whether these features, elements and/or steps are included or are to be performed in any particular example.

Disjunctive language such as the phrase “at least one of X, Y, or Z,” unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that some examples require at least one of X, at least one of Y, or at least one of Z to each be present.

Any process descriptions, elements or blocks in the flow diagrams described herein and/or depicted in the attached figures should be understood as potentially representing modules, segments, or portions of code which include executable instructions for implementing specific logical functions or elements in the process. Alternate examples are included within the scope of the examples described herein in which elements or functions may be deleted, executed out of order from that shown, or discussed, including substantially, concurrently, or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure.

Any process descriptions, elements or blocks in the flow diagrams described herein and/or depicted in the attached figures should be understood as potentially representing modules, segments, or portions of code which include executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A system comprising:

a first vehicle control unit comprising:

a first vehicle controller configured to control one or more first vehicle functions not including control of airbag deployment;

a first restraint control module (RCM) configured to control airbag deployment and to communicate with the first vehicle controller over a first direct connection; and first connectors shared by the first vehicle controller and the first RCM, the first connectors configured to communicate first sensor data to the first vehicle controller and the first RCM, the first connectors further configured to communicate first airbag deployment signals from the first RCM;

an inertia sensing module (ISM) configured to send the first sensor data to the first vehicle controller and the first RCM via the first connectors;

first sensors configured to communicate the first sensor data to the first vehicle controller and the first RCM via the first connectors; and first pyrotechnic initiators configured to receive the first airbag deployment signals from the first RCM via the first connectors.

2. The system of claim 1, wherein the first RCM comprises:

a first RCM application specific integrated circuit (ASIC) configured to process the first sensor data; and a first RCM controller configured to communicate with the first vehicle controller, wherein the first airbag deployment signals are generated based on the first RCM ASIC and the first RCM controller.

3. The system of claim 1, wherein the ISM is housed separately from the first RCM, and wherein the ISM comprises:

inertia measuring unit (IMU) sensors configured to measure acceleration; and an IMU controller configured to communicate with the first RCM, wherein the first airbag deployment signals are generated based on a communication between the first RCM and the IMU controller.

4. The system of claim 1, wherein the first airbag deployment signals are generated based on a communication between the first RCM and the first vehicle controller.

5. The system of claim 1, wherein the first direct connection is a trace on a printed circuit board (PCB) shared by the first vehicle controller and the first RCM.

6. The system of claim 1, further comprising:

a second vehicle control unit comprising:

a second vehicle controller to control one or more second vehicle functions not including control of airbag deployment; and second connectors to communicate second sensor data to the second vehicle controller; and second sensors to communicate the second sensor data to the second vehicle controller.

7. The system of claim 6, wherein the first RCM is further configured to communicate with the second vehicle controller, and wherein the first airbag deployment signals are generated based on a communication between the first RCM and the second vehicle controller.

8. The system of claim 6, wherein the first RCM is further configured to receive the second sensor data via the second vehicle controller.

9. The system of claim 6, further comprising:

second pyrotechnic initiators configured to receive second airbag deployment signals from the first RCM through the second vehicle controller.

10. The system of claim 6, wherein the first vehicle functions are associated with a first side of a vehicle, and wherein the second vehicle functions are associated with a second side of the vehicle.

11. The system of claim 6, wherein the second vehicle control unit further comprises:

a second RCM configured to control airbag deployment and to communicate with the second vehicle controller over a second direct connection.

12. The system of claim 11, wherein the first RCM is further configured to control airbag deployment for first airbag systems of a first side of a vehicle, and wherein the second RCM is further configured to control airbag deployment for second airbag systems of a second side of the vehicle.

13. The system of claim 11, wherein the first RCM is further configured to receive the second sensor data via the second RCM, and wherein the second RCM is further configured to receive the first sensor data via the first RCM.

14. The system of claim 11, wherein the first airbag deployment signals are generated based on a communication between the first RCM and the second RCM.

15. The system of claim 11, further comprising:

second pyrotechnic initiators configured to receive second airbag deployment signals from the second RCM through the second vehicle controller, wherein the second airbag deployment signals are generated based on a communication between the first RCM and the second RCM.

16. A system comprising:

a first vehicle control unit comprising:

a first vehicle controller configured to control one or more first vehicle functions; and first connectors shared by the first vehicle controller and a restraint control module (RCM), the first connectors configured to communicate first sensor data to the first vehicle controller and the RCM;

the RCM configured to communicate with the first vehicle controller, an inertia sensing module (ISM) configured to send the first sensor data to the first vehicle controller via the first connectors;

first sensors configured to communicate the first sensor data to the first vehicle controller via the first connectors; and first pyrotechnic initiators configured to receive first airbag deployment signals via the first connectors.

17. The system of claim 16, wherein the RCM is further configured to receive the first sensor data via the first vehicle controller, and wherein the RCM is further configured to send the first airbag deployment signals via the first vehicle controller.

18. The system of claim 16, further comprising:

a second vehicle control unit comprising:

a second vehicle controller configured to control one or more second vehicle functions; and second connectors configured to communicate second sensor data to the second vehicle controller;

second sensors configured to communicate the second sensor data to the second vehicle controller via the second connectors; and second pyrotechnic initiators configured to receive second airbag deployment signals via the second connectors.

19. The system of claim 18, wherein the RCM is further configured to receive the second sensor data via the second vehicle controller, and wherein the RCM is further configured to send the second airbag deployment signals via the second vehicle controller.

20. A method of manufacturing a vehicle, the method comprising:

providing a first vehicle control unit comprising a first vehicle controller to control one or more first vehicle functions;

integrating a first restraint control module (RCM) onto a printed circuit board (PCB) of the first vehicle controller, the first RCM to communicate with the first vehicle controller over a first direct connection;

communicatively coupling first connectors shared by the first vehicle controller and the first RCM to communicate first sensor data to the first vehicle controller and the first RCM, the first connectors further communicatively coupled to communicate first airbag deployment signals from the first RCM;

providing an inertia sensing module (ISM) to send the first sensor data to the first vehicle controller and the first RCM via the first connectors;

installing first sensors to communicate the first sensor data to the first vehicle controller and the first RCM via the first connectors; and installing first pyrotechnic initiators to receive the first airbag deployment signals from the first RCM via the first connectors.

* * * * *